(12) United States Patent
Spoonhower et al.

(10) Patent No.: US 7,294,446 B2
(45) Date of Patent: Nov. 13, 2007

(54) DIGITAL ANALOG RECORDING USING NEAR FIELD OPTICAL IMAGING

(75) Inventors: John P. Spoonhower, Webster, NY (US); David L. Patton, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 935 days.

(21) Appl. No.: 10/045,805

(22) Filed: Oct. 29, 2001

(65) Prior Publication Data

US 2003/0081300 A1     May 1, 2003

(51) Int. Cl.
    *G11B 7/24*     (2006.01)
(52) U.S. Cl. .......... 430/269; 430/270.11; 430/945; 428/64.6; 428/64.4; 369/275.4; 369/275.5
(58) Field of Classification Search ............ None
    See application file for complete search history.

(56) References Cited

U.S. PATENT DOCUMENTS

| | | | | |
|---|---|---|---|---|
| 3,465,352 A | * | 9/1969 | Bernstein et al. | 347/259 |
| 3,648,587 A | * | 3/1972 | Stevens | 355/44 |
| 3,701,999 A | * | 10/1972 | Congleton et al. | 347/260 |
| 3,998,989 A | * | 12/1976 | Pardee et al. | 428/409 |
| 4,219,704 A | * | 8/1980 | Russell | 369/108 |
| 4,322,759 A | * | 3/1982 | Zenzefilis | 386/125 |
| 4,346,449 A | | 8/1982 | Ovshinsky et al. | |
| 4,999,278 A | * | 3/1991 | Bouldin | 430/270.11 |
| 5,031,168 A | | 7/1991 | Moore | |
| 5,272,330 A | | 12/1993 | Betzig et al. | |
| 5,470,627 A | * | 11/1995 | Lee et al. | 428/64.4 |
| 5,721,687 A | | 2/1998 | Lamartine et al. | |
| 6,278,679 B1 | * | 8/2001 | Weiss et al. | 369/108 |
| 2002/0034705 A1 | * | 3/2002 | Irie et al. | 430/270.15 |
| 2002/0122378 A1 | | 9/2002 | Kubo | |

FOREIGN PATENT DOCUMENTS

| | | | |
|---|---|---|---|
| EP | 0 376 354 | | 7/1990 |
| EP | 0 714 093 | | 5/1996 |
| EP | 1 083 553 A2 | | 3/2001 |
| JP | 58-100235 | * | 6/1983 |
| JP | 59-005248 | * | 1/1984 |
| JP | 01-144247 | * | 6/1989 |
| JP | 06-267071 | * | 9/1994 |
| JP | 11/086505 | | 3/1999 |
| JP | 11-110816 | * | 4/1999 |
| JP | 2001-076382 | * | 3/2001 |
| JP | 2001-184691 | * | 7/2001 |
| WO | 00/02194 | | 1/2000 |

OTHER PUBLICATIONS

Hamano et al. "Rewritable Near filed optical recording on photochromic films", Jap. J. Appl.. Phys, vol. 35 (pt 1, No. 3) pp. 1764-1767 (1996).*

"Imaging with Solid Immersion Lenses, Spatial Resolution, and Applications", Qiang Wu, Luke P. Ghislain, V. B. Elings, Proceedings of the IEEE, vol. 88, No. 9, Sep. 2000, pp. 1491-1498.

* cited by examiner

*Primary Examiner*—Martin Angebranndt
(74) *Attorney, Agent, or Firm*—Frank Pincelli

(57) ABSTRACT

A data storage device and method of making the storage device wherein a digital and analog image may be stored thereon. The storage device includes a photosensitive layer capable of retaining an optical image thereon, which may be written in a digital format that can also be read digitally.

9 Claims, 9 Drawing Sheets

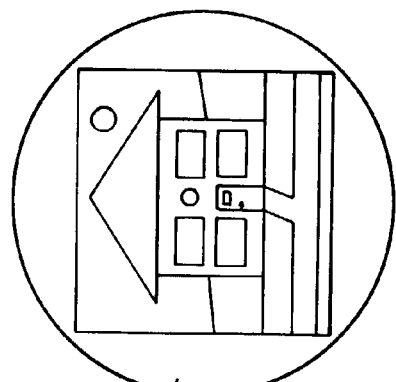
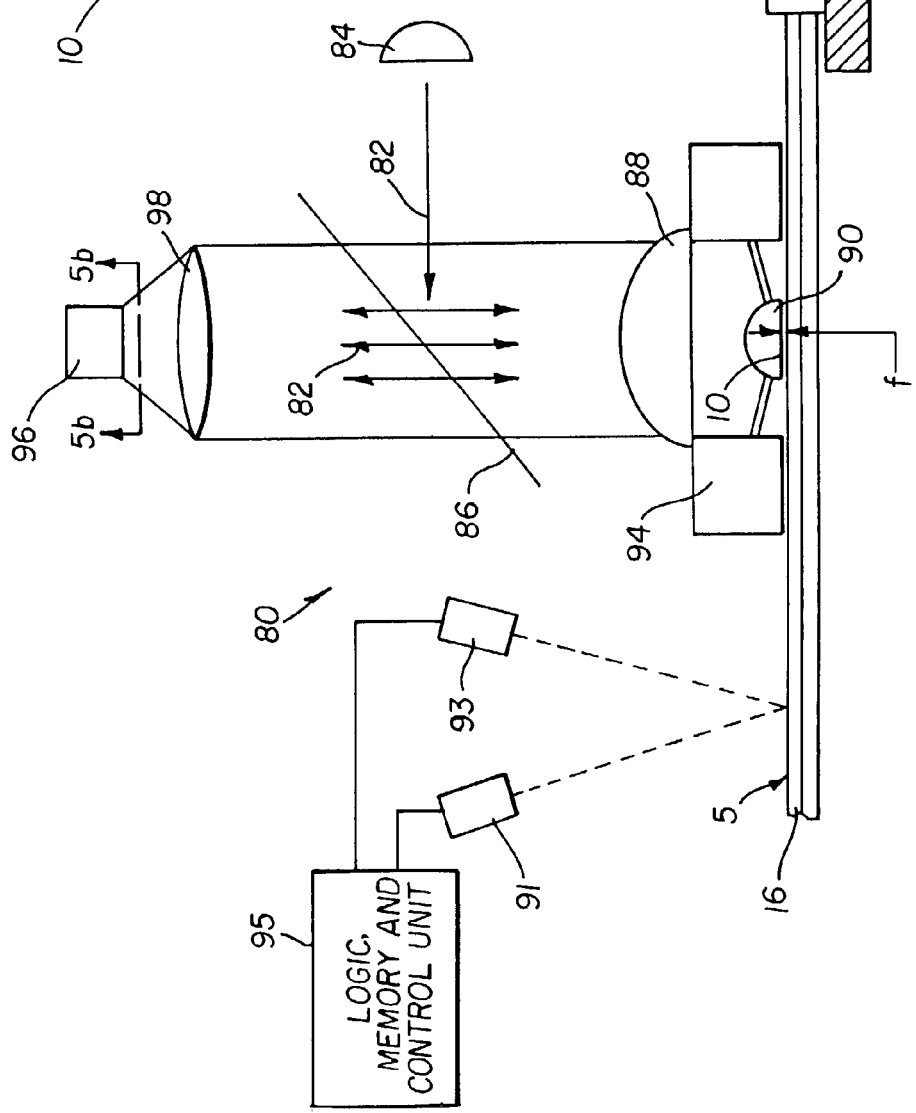
FIG. 5b
FIG. 5a

DIGITAL ANALOG RECORDING USING NEAR FIELD OPTICAL IMAGING

FIELD OF THE INVENTION

This invention relates to an article, system and method used for creating a digital/analog recording.

BACKGROUND OF THE INVENTION

Recent advances in optics provide for a method of exposure of materials on a length scale much smaller than previously realized. Such near-field optical methods are realized by placing an aperture or a lens in close proximity to the surface of the sample or material to be exposed. Special methods for positioning control of the aperture or lens are required, as the distance between the optical elements (aperture or lens) and the material surface is extremely small. Betzig and Trautman in U.S. Pat. No. 5,272,330 reported on the use of tapered optical fibers as a means of providing exposures in extremely small areas; exposures of the size of 10 nm in area are now relatively commonplace. In this case, the fiber tip position is maintained to be within some nanometers (typically 10-50) of the target surface. Others (see, for example, the review by Q. Wu, L. Ghislain, and V. B. Elings, Proc. IEEE (2000), 88(9), pg. 1491-1498) have developed means of exposure by the use of the solid immersion lens (SIL). The SIL is positioned within approximately 0.3 micrometer of the target surface by the use of special nano-positioning technology as in the case of the tapered optical fiber. SIL technology offers the advantage that the lens provides a true imaging capability, i.e. features in a real object can be faithfully rendered in an image of reduced spatial extent. In the case of the SIL, images can be produced much smaller than the image size achievable through the use of conventional or classical optics. Such conventional optics is said to be diffraction-limited because the size of the smallest feature in an image is limited by the physical diffraction. Exposures produced by means of the SIL or other near-field optical methods can be much smaller in spatial extent than those produced by conventional optical systems and still be readable. Near-field optics has been used to create single marks in recording media and used to capture images not capable of being captured using a conventional optical microscope. A problem of the prior art image storage is that it relies on a single method for retrieving the image. For example; in a digital data storage system the data is encoded in a digital file, while in an optical system an analog image is recorded. When the digital file is written, a protocol or hierarchical file structure is used to specify to the reading device how the data has been written. Over time, different methods of recording or writing, including different means of encoding the data in digital files evolve and the devices and media used to read the files may change and become obsolete. When this happens it becomes very difficult if not impossible to retrieve these files. In the case where images are used as the means for recording and storing data, larger amounts of storage space on the recording medium and different materials are required for recording and storing the data compared to digital methods.

Near-field technology as used in the present invention provides a means of exposure to be used in the production of small images and to use these images for the production of a novel image storage system capable of mixed analog and digital means of storage. Such a mixed mode storage system has the advantage of providing image storage with retrieval means independent of digital storage format specifications, while requiring less space than conventional image storage means.

SUMMARY OF THE INVENTION

In accordance with one aspect of the present invention there is provided a method of making a digital and analog image storage product, comprising the steps of:

providing a photosensitive medium capable of forming an image thereon when exposed to light and is also capable of storing data in a digital format; and providing an analog and digital image on the medium simultaneously using a near-field-imaging device.

In accordance with another aspect of the present invention there is provided a data storage product having a support having a first surface and a second surface, the first surface having a layer made of a material on which digital data may be printed. The second surface having a photosensitive layer made of a material on which analog image may be printed.

In accordance with yet another aspect of the present invention there is provided a method for encoding digital data and image data on a storage product such that optical images or portions of optical images formed thereon can be read optically without interfering with reading of the digital data, comprising the steps of:

forming digital data in a storage product;

forming optical images on the storage product in a separate step.

In yet another aspect of the present invention there is provided a storage device having a photosensitive layer capable of retaining an optical image thereon and wherein the optical images may be written in a digital format that can also be read digitally.

These and other aspects, objects, features and advantages of the present invention will be more clearly understood and appreciated from a review of the following detailed description of the preferred embodiments and appended claims and by reference to the accompanying drawings.

BRIEF DESCRIPTION OF THE DRAWINGS

In the detailed description of the preferred embodiments of the invention presented below, reference is made to the accompanying drawings in which:

FIG. 2a is a cross-sectional view of the medium of FIG. 1a as taken along line 2a-2a of FIG. 1a;

FIG. 4 is a flow chart illustrating a method for making the medium of FIG. 1a;

FIG. 5a is a schematic view of a reading/retrieval apparatus made in accordance with the present invention used for retrieving the images formed on the medium described in FIG. 2a;

FIG. 5b is an enlarged partial view of the image retrieved and displayed for viewing by the apparatus described in FIG. 5a;

FIG. 6a is a top plan view of a modified digital and analog recording medium of FIG. 2b as taken along line 6a-6a;

FIG. 6b is a bottom plan view of the digital and analog recording medium of FIG. 2b as taken along line 6a-6a;

DETAILED DESCRIPTION OF THE INVENTION

The invention has been described in detail with particular reference to certain preferred embodiments thereof, but it will be understood that variations and modifications can be affected within the spirit and scope of the invention.

Figure 1A:
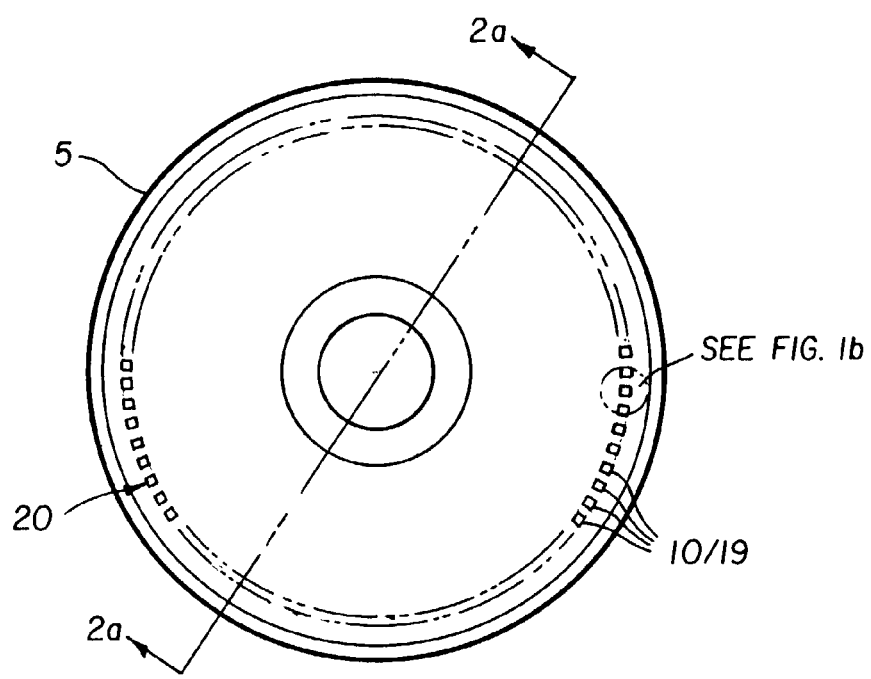
FIG. 1a is a plan view of a digital/analog recording medium made in accordance with the present invention.
Figure 1B:
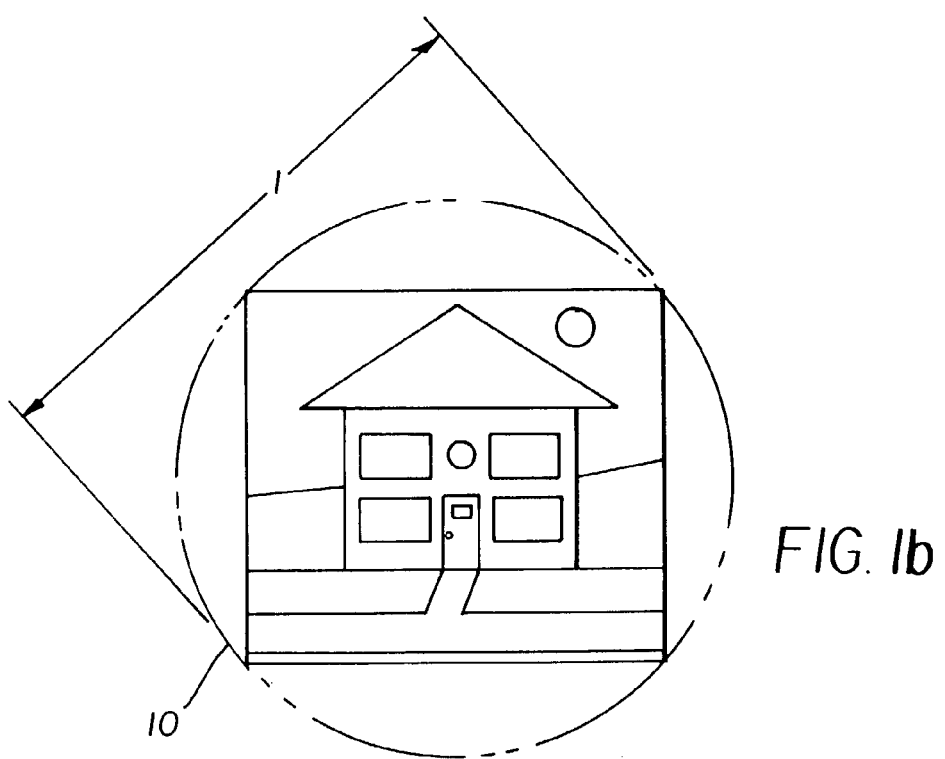
FIG. 1b is an enlarged partial view of the digital/analog recording medium of FIG. 1a as represented by the circle 1b.

The digital/analog storage system comprises digital data "bits" (for example, marks on a storage medium such as an optical disk as described later herein), which are analog "near-field optical images" or portions of analog images as shown in FIG. 1b. The data bits 19 are of such size that they can be read digitally to obtain a digital record and read in an analog means also to obtain an image. Applicants have found the size of the data bits can be of the order of 10 micron to 500 microns, depending upon the size and resolution requirements of the image. The method comprises imaging using an imaging device as described in FIG. 3, which employs near-field optics. This method provides archival storage of images that is independent of a particular digital file format.

Referring to FIG. 1a, there is illustrated a plan view of medium 5. In the particular embodiment illustrated, the medium 5 is an optical disk. The medium 5 can be any one of a variety such as a CD-rom, writeable CD, DVD, writeable DVD, digital optical tape, etc. The medium 5 containing a plurality of near-field optical images 10 recorded as digital bits 19 in a digital data stream 20 shown in an enlarged plan view in FIG. 1b. FIG. 1b illustrates one of the images 10 that form the data stream 20 where the data stream 20 is actually the same image illustrated in FIG. 1b recorded digitally. Preferably the length "1" of the image of the image 10 is no greater than about 500 microns. The image 10 can be a circle, square, rectangle, ellipse, etc. A plurality of images 10 are formed on the medium 5 using near-field optics, which will be explained later in FIG. 3. The digital data stream 20 is created by forming a plurality of images 10 in a pattern of 16 or 32 bit data streams with start bits and stop bits capable of being read and decoded using known methods for reading and decoding digital data, for example, run length encoding.

Figure 2A:
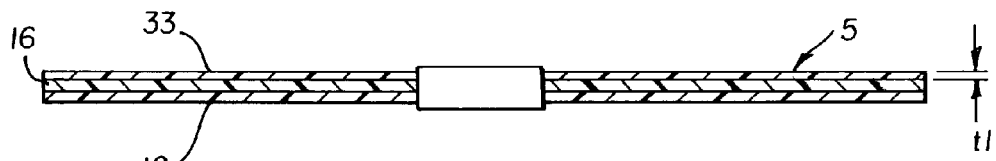

Referring to FIG. 2a, there is illustrated a cross-sectional view of the medium 5. The medium 5 comprises a support structure 12. In the particular embodiment illustrated, the support structure 12 is polycarbonate. Over the support structure 12 there is provided the imaging layer 16 that can be coated directly onto the support structure 12. The imaging layer 16 is made of a material that changes characteristics when exposed to different wavelengths of light (photosensitive). This material can be, for example, photo-chromic molecules, fluorescent materials and/or silver halide emulsions. In the embodiment illustrated the imaging layer 16 is coated directly onto the support structure 12, as is well known to those skilled in the art the imaging layer and the support structure can be one and the same. If desired, a protective layer 33 can be applied over the imaging layer 16. The protective layer 33 can be formed using acrylic, acrylic polymers, vinyl polymers, polyurethanes, polyesters, and the like. The protective layer 33 can also be formed using chemical vapor deposition with material such as oxides and/or nitrides. In either case the protective layer can have a maximum thickness t1 on the order of 100 nanometers, when such near-field recording methods are used.

Figure 2B:
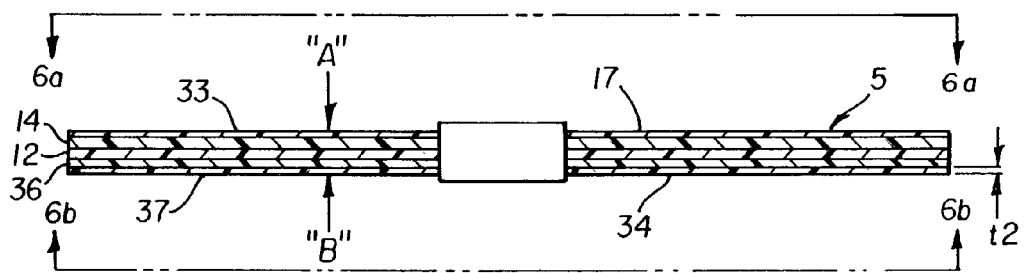
FIG. 2b is a cross-sectional view of a modified medium made in accordance with the present invention having a digital recording layer on one surface of the medium and an analog recording layer on the other surface of the medium.

Referring to FIG. 2b there is illustrated cross-sectional view of a modified medium 5 made in accordance with the present invention. In the particular embodiment illustrated modified medium 5 has a digital recording side "A and an analog recording side "B". The support structure 12 for example is polycarbonate. A digital recording layer 14 is provided on the top surface 17 of the support structure 12. The digital recording layer 14 is a dye, for example, metallized phthalocyanine. A protective layer 33 can be placed over the digital recording layer 14. An analog imaging layer 36 is provided on the bottom surface 34 of the support structure 12. The analog imaging layer 36 can be, for example, photo-chromic molecules, fluorescent materials and/or silver halide emulsions. A protective layer 37 can be placed over the analog imaging layer 36. The protective layers 33 and 37 can be formed using acrylic, acrylic polymers, vinyl polymers, polyurethanes, polyesters, and the like. The protective layers 33 and 37 can also be formed using chemical vapor deposition with material such as oxides and/or nitrides. In either case the protective layers can have a maximum thickness of t1 and t2 respectively on the order of 100 nanometers.

Figure 2C:
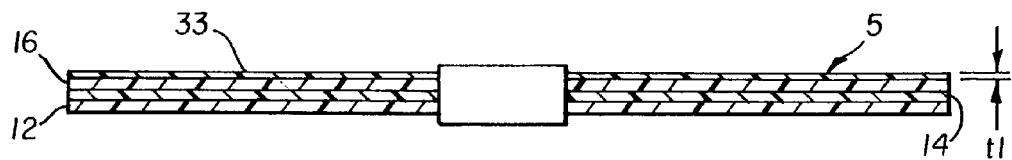
FIG. 2c is a cross-sectional view similar to FIG. 2b of yet another modified medium made in accordance with the present invention having a separate digital recording layer and a separate analog recording layer on same side of the medium.

Referring to FIG. 2c there is illustrated a cross-sectional view of another modified medium 5 made in accordance with the present invention. Like numbers represent like parts and operations as previously described. In the particular embodiment illustrated modified medium 5 a separate analog recording layer 16 and a separate digital recording layer 14 is provided on the same side of the support structure 12. The analog imaging layer 16 can be for example photo-chromic molecules, fluorescent materials and/or silver halide emulsions. The digital recording layer 14 is a dye, for example, metallized phthalocyanine. A protective layer 33 can be placed over the analog recording layer 16. The protective layer 33 can be formed using acrylic, acrylic polymers, vinyl polymers, polyurethanes, polyesters, and the like. The protective layer 33 can also be formed using chemical vapor deposition with material such as oxides and/or nitrides. In either case the protective layer can have a maximum thickness t1 on the order of 100 nanometers. In the embodiment shown the analog recording layer 16 is coated directly onto the digital recording layer 16. It is well known by those skilled in the art that a substrate not shown may be required between the two layers.

Figure 3:
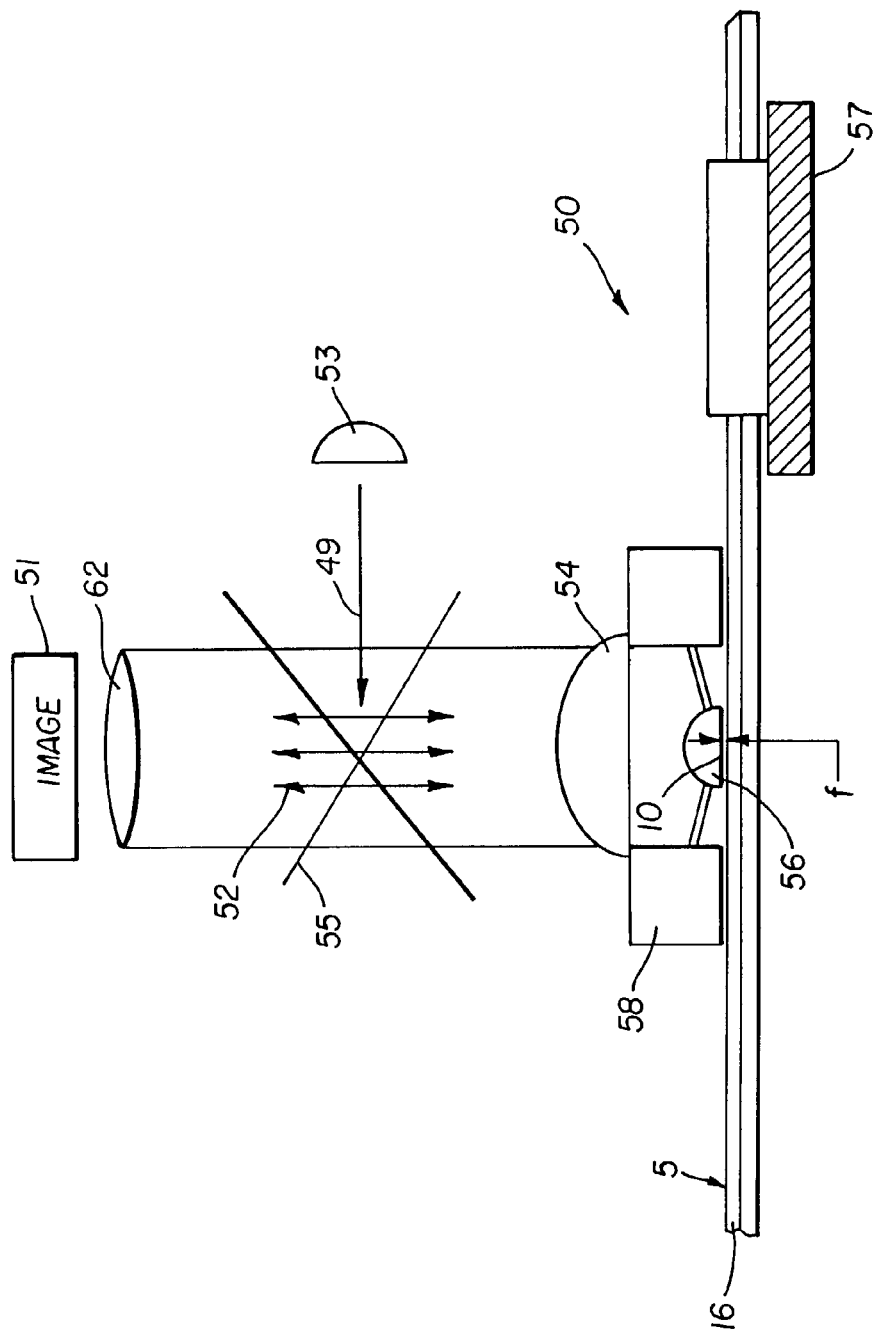
FIG. 3 is a schematic view of an apparatus for forming the digital/analog image record on the medium of FIG. 1a using near-field optics.

Referring now to FIG. 3, there is illustrated an apparatus 50 for forming the image(s) 10 on medium 5. The object 51 is a macroscopic representation of the image 10 to be formed on medium 5. The image 10 is formed in the imaging layer 16 by transferring light from the object 51. The light beam 49 from a light source 53 reflects from a beam splitter 55, through a lens system 62 reflects off the object 51, and passes through an objective lens 54 of conventional design and impinges onto a solid immersion lens (SIL) 56. The medium 5 resting on a stage 57 is placed within a critical distance f. Images formed from such a system will have a high lateral spatial resolution in layer 16. The light beam 52 passes through an objective lens 54 of conventional design and impinges onto a solid immersion lens (SIL) 56. The SIL 56 is positioned within the near-field-coupling limit appropriate for the particular lens in use by the use of a positioning device 58. European Patent No. 1083553 provides an example of the means to position an SIL at the appropriate distance from the recording surface, which is incorporated by reference herein. Such a positioning device could be a flying head as is used in hard disk storage devices. Alternately there are many known in the art as nano or micro positioning technologies. The image 10 can be obtained from a variety of sources such as an illuminated object, a negative, print, and/or a softcopy display. The softcopy display can be a CRT, OLED or other similar type device. The image 10 can be monochrome or color.

Figure 4:
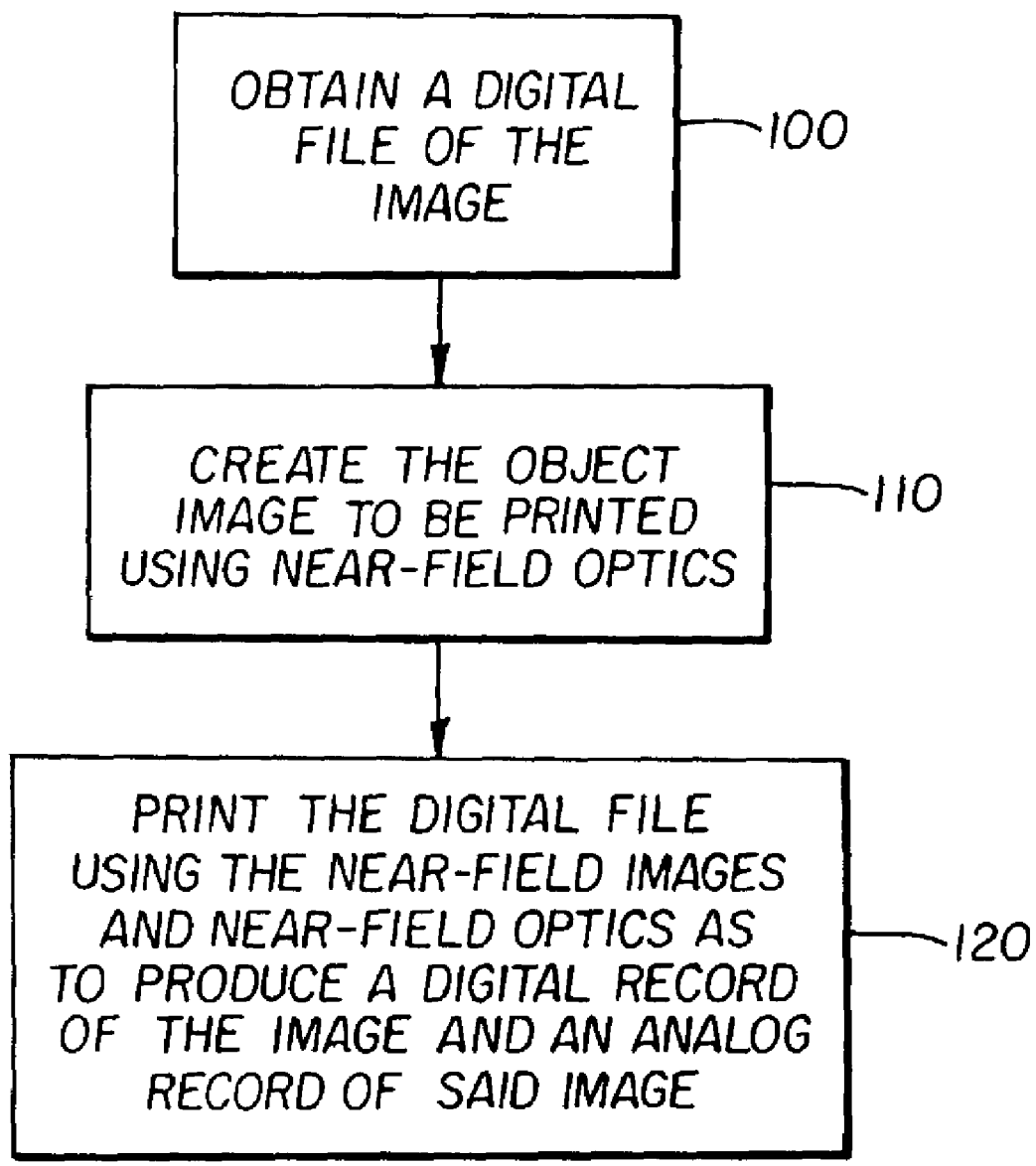

Now referring to FIG. 4, there is illustrated a flow chart of the method according to the present invention. The method comprises creation of a digital file of the characteristic image to form the image 10. A digital file of the image is obtained at step 100. Such image digitization methods are well known to those versed in the art. The digital file may be obtained by scanning a negative or hard copy of the image such as a print, from a digital camera, from a storage device such as a CD, floppy disk, memory stick, PCMCIA card, etc. The digital representation of the image is encoded by any one of a variety of means, such as run length encoding. An object 51 of the digital image 10 is created at step 110 using a variety of means such as a softcopy display. The image 10 can be black and white or color. The softcopy display can be a CRT, organic light emitting diode (OLED) display, or other similar type device. Using near-field optics, the image 10 is formed onto the medium 5 at step 120 so as to produce a digital record and an analog record of the image 10. The forming of the digital record typically involves creation of marks or pits in the recording media. The data once encoded are read out by recording electronic signals that indicate varying light reflectance levels as a consequence of the presence of the marks. For analog recording, the image may be read out using a variety of means including variation in the reflectance, or fluorescence signal. There is an additional media requirement however in this case; the media must have a response dynamic range capable of capturing the intensity variation in the original scene, unless simple black and white images are all that is required.

Referring now to FIG. 5*a*, the image(s) 10 previously recorded on the layer can be retrieved by optical (analog) means or by digital technology. The image(s) 10 are retrieved via the analog method by scanning or optically viewing the medium 5. The image(s) 10 can be viewed using magnifying imaging device 80 to retrieve by analog means the image(s) 10 from the medium 5. The light beam 82 from a light source 84 reflects from a beam splitter 86 and passes through an objective lens 88 of conventional design and impinges onto a solid immersion lens (SIL) 90. The medium 5 in the form of an optical disk resting on a stage 92 is placed within a critical distance f. The SIL 90 is positioned within the near-field coupling limit appropriate for the particular lens in use by the use of a positioning device 94. Such a positioning device could be a flying head as is used in hard disk storage devices. The light beam 82 is reflected from the image 10 on the imaging layer 16 of the medium 5, passes through the SIL 90, the objective lens 88, and the beam splitter 86, forming the image 10 onto a sensor 96 by a lens system 98.

Still referring to FIG. 5*a*, the image(s) 10 that have been recorded digitally can be retrieved by digital means using a laser 91, photo detector 93 and logic, and control and memory unit 95 as known by those of ordinary skill in the art.

Referring now to FIG. 5*b*, an enlarged view of the image 10 retrieved by the device 80 is shown. Using the imaging device 80, the image 10 is displayed for viewing.

Figure 6A:
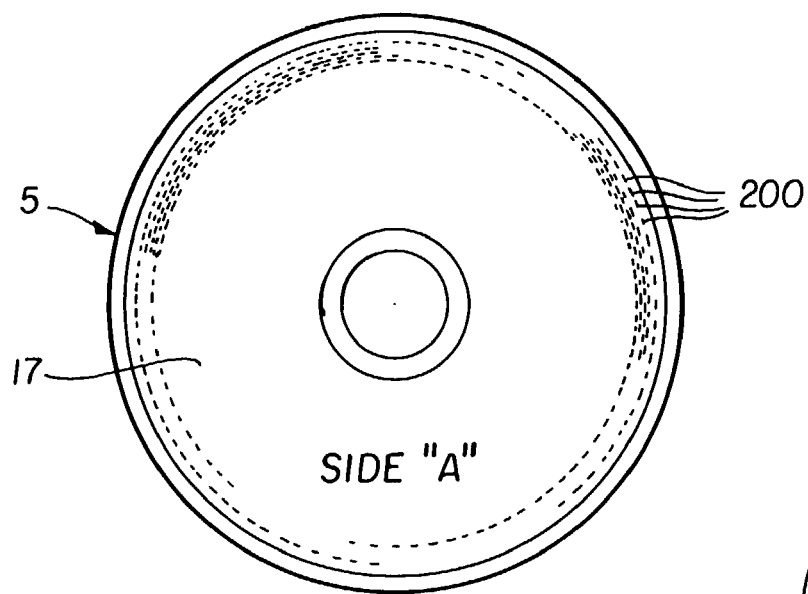
Figure 6C:
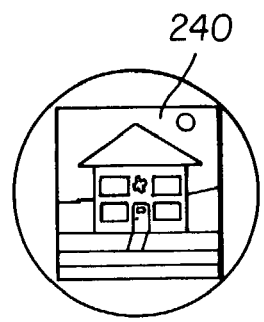
FIG. 6c illustrates a greatly enlarged view of one of the images that forms part of the digital record of FIG. 6a where part of the digital record is actually the same image recorded (analog) using near-field optical imaging in FIG. 6b.
Figure 6B:
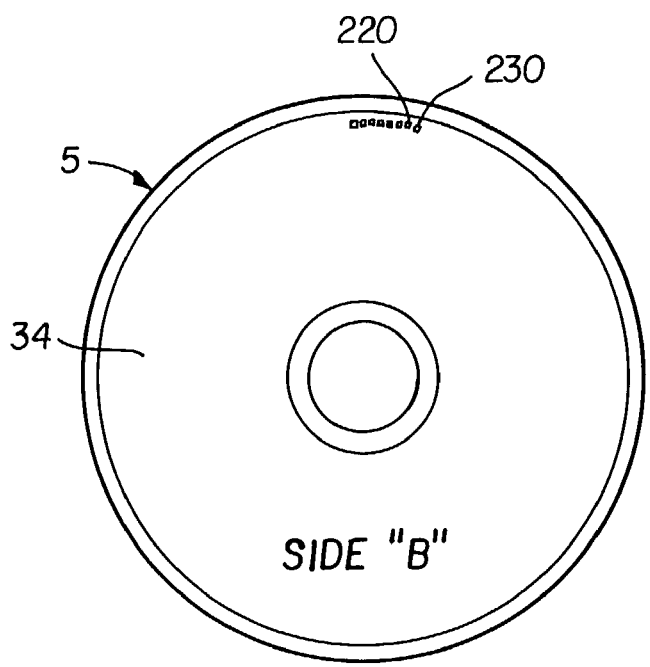

Referring now to FIGS. 6*a* and 6*b*, there is illustrated plan views of the modified medium 5 made in accordance with the present invention. In the embodiment shown the modified medium 5 is an optical disk. The modified medium 5 can be any one of a variety such as a CD-rom, writeable CD, DVD, writeable DVD, digital optical tape, etc. The modified medium 5 is comprised of side "A" (FIG. 6*a*) which shows a digital record 200 of the images 240 and 250 illustrated in FIGS. 6*c* and 6*d* respectively and side "B" which shows a analog record 220 and 230 of images 240 and 250 respectively illustrated in FIGS. 6*c* and 6*d* as described in FIG. 2*b*. The modified medium 5 allows for both the digital record 200 and analog record 220 of images on the same medium 5.

FIG. 6*c* illustrates one of the images 240 that forms part of the digital record 200. The same image 240 is also recorded (analog) using near-field optical imaging on side "B" as represented by 220.

Figure 6D:
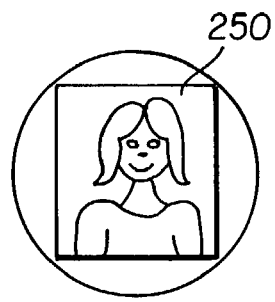
FIG. 6d illustrates a greatly enlarged view of another one of the images that forms part of the digital record of FIG. 6a where part of the digital record is actually the same image recorded (analog) using near-field optical imaging in FIG. 6b.

FIG. 6*d* illustrates another one of the images 250 that forms part of the digital record 200. The same image 250 is recorded (analog) using near-field optical imaging on side "B" as represented by 230.

Figure 7:
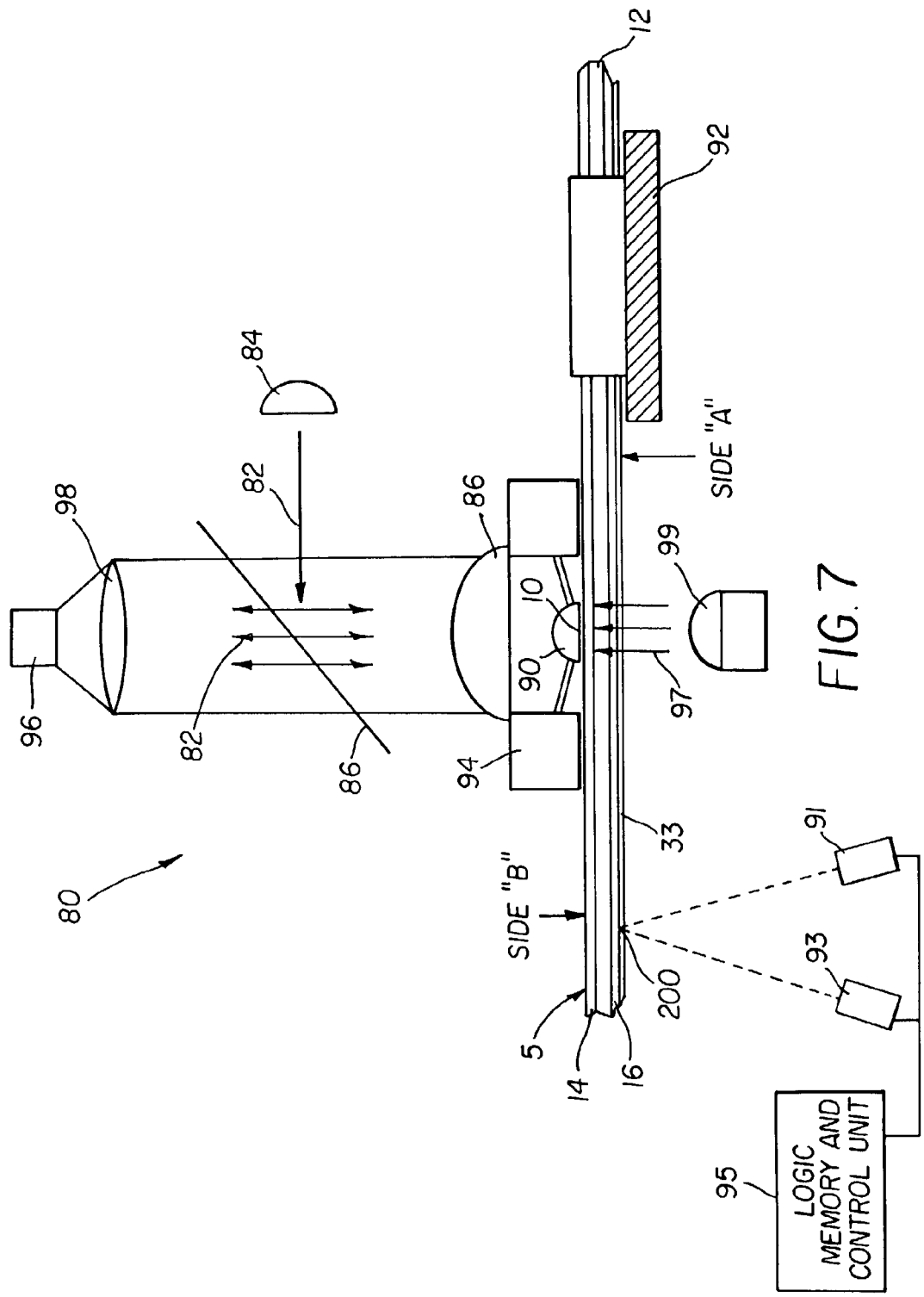
FIG. 7 is a schematic view of a modified reading/retrieval apparatus also made in accordance with the present invention used for retrieving the images formed on the modified medium described in FIG. 2b.

Referring now to FIG. 7, the images 10 that has been optically recorded on side "B" (see FIG. 6*b*) are retrieved by optical (analog) means and the images 10 that are contained in the digital record 200 on side "A" (see FIG. 6*a*) are retrieved by digital means. The images 10 on side "B" are retrieved via the analog method by optically viewing the medium 5 using near-field optical imaging. The images 10 can be viewed using magnifying imaging device 80 to retrieve by analog means the images 10 from the medium 5. The light beam 82 from a light source 84 reflects from a beam splitter 86 and passes through an objective lens 88 of conventional design and impinges onto a solid immersion lens (SIL) 90. The modified medium 5 in the form of an optical disk resting on a stage 92 is placed within a critical distance f. The SIL 90 is positioned within the near-field coupling limit appropriate for the particular lens in use by the use of a positioning device 94. Such a positioning device could be a flying head as is used in hard disk storage devices. The light beam 82 is reflected from the image 10 on the medium 5, passes through the SIL 90, the objective lens 88, and the beam splitter 86, imaging the image 10. The images 10 can also be imaged onto the sensor 96 by the lens system 98 by illuminating the image 10 via light beams 97 from a light source 99 which transmit through the modified medium 5.

The images 10 can be retrieved from the digital record 200 on side "A" by digital means using a laser 91, photo detector 93 and logic, and control and memory unit 95 as known by those of ordinary skill in the art.

Figure 8A:
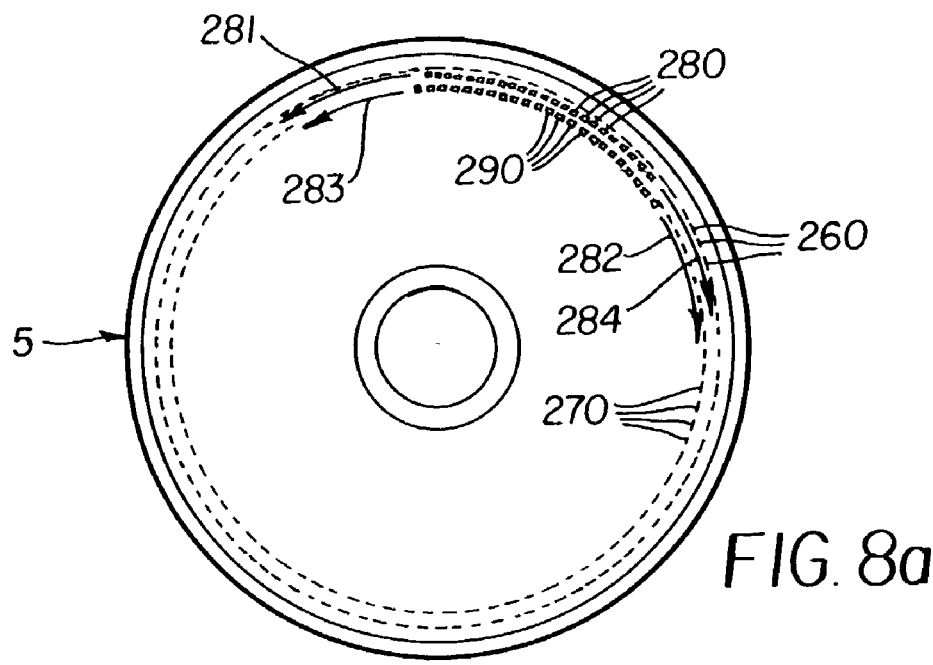
FIG. 8a is a top plan view of yet another modified digital and analog recording medium of FIG. 2c.

Referring now to FIG. 8a, there is illustrated a plan view of the yet another modified medium 5 made in accordance with the present invention. Like numbers represent like parts and operations as previously described. In the particular embodiment illustrated modified medium 5 is an optical disk (as described in FIG. 2c) with the separate analog recording layer 16 and separate digital recording layer 14 provided on the same side of the medium 5. The digital recording layer 14 is below the analog recording layer 16. The modified medium 5 can be any one of a variety such as a CD-rom, writeable CD, DVD, writeable DVD, etc. The modified medium 5 shows digital records 260 and 270 and analog records 280 and 290 respectively. The arrows 282, 283, 284, and 285 indicate the images such as shown in FIGS. 6c and 6d can extend in a circle around the medium 5. The modified medium 5 allows for both the digital records 260 and 270 and analog records 280 and 290 of images on the same side of the medium 5.

Figure 8B:
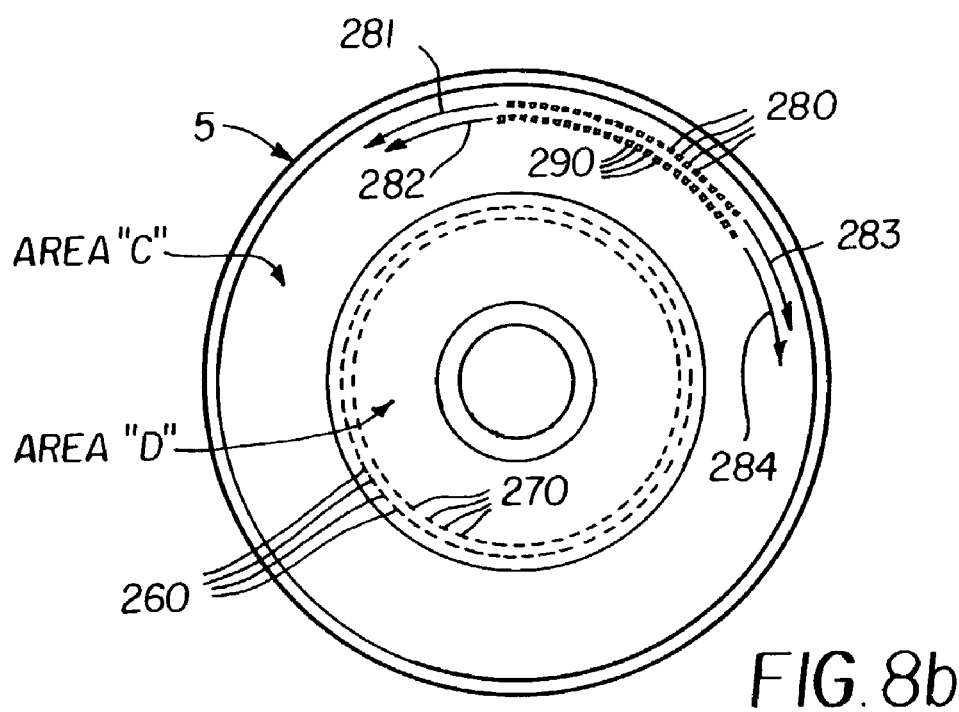
FIG. 8b is a top plan view of yet another modified digital and analog recording medium of FIG. 2c.
Figure 9:
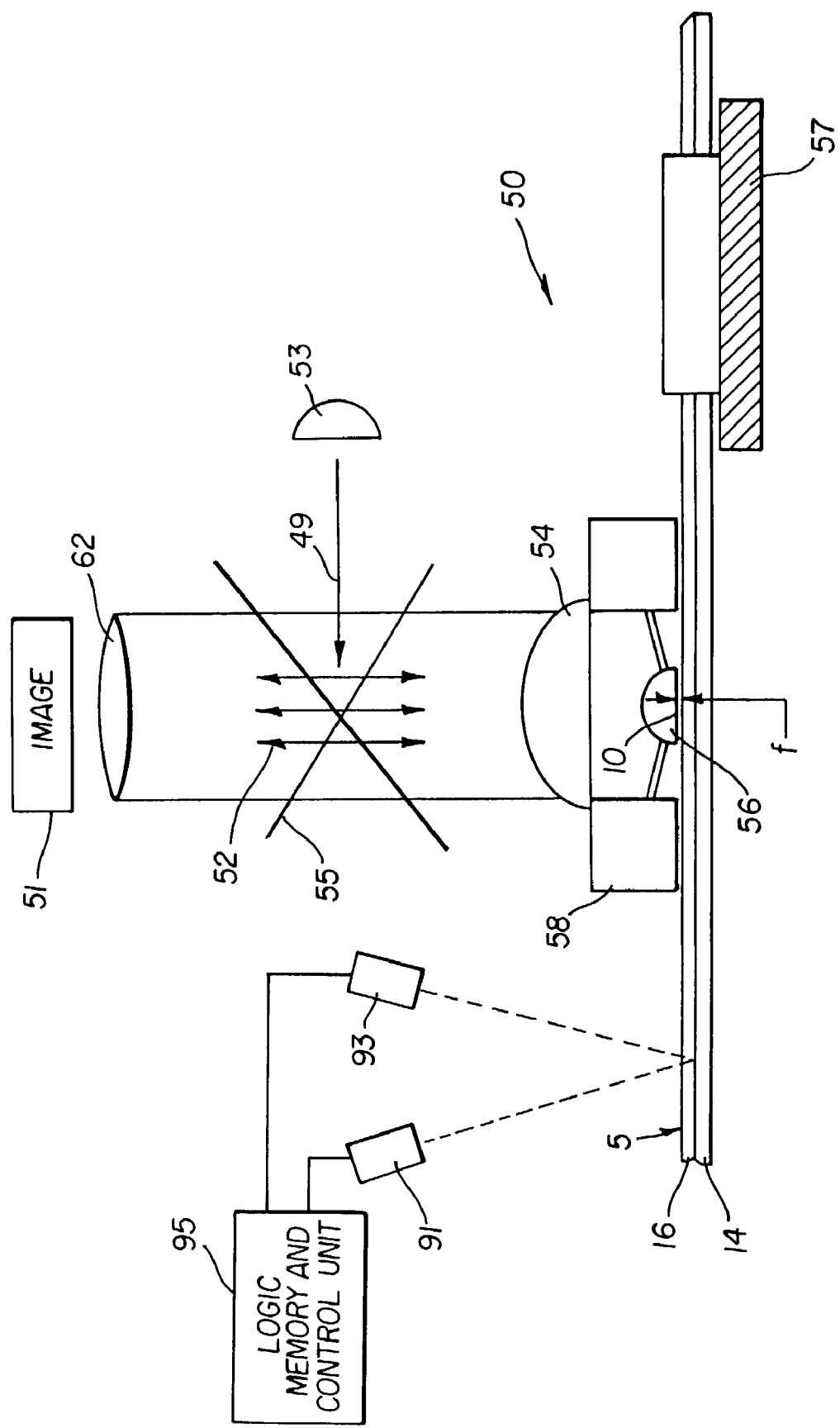
FIG. 9 is a schematic view of yet another apparatus also made in accordance with the present invention used for forming separate digital and separate analog images recorded on the same surface of the medium of FIG. 2c using near-field optics.

Referring now to FIG. 8b, there is illustrated a plan view of the yet another modified medium 5 made in accordance with the present invention. Like numbers represent like parts and operations as previously described. In the particular embodiment illustrated modified medium 5 is an optical disk (as described in FIG. 2c) with the separate analog recording layer 16 and separate digital recording layer 14 provided on the same side of the medium 5. In the particular embodiment shown the and analog records 280 and 290 can be formed in area "C" and the digital records 260 and 270 can be formed in area "D". Referring to FIG. 9, there is illustrated yet another apparatus 50 for forming both the digital data stream 20 and the analog image(s) 10 on medium 5 made in accordance with the present invention. Like numbers represent like parts and operations as previously described. The data stream 20 is recorded on the digital recording layer 14 using the laser 91, photo detector 93 and logic, control and memory unit 95 as known by those of ordinary skill in the art. The analog image 10 of the object 51 is formed in the imaging layer 16 by transferring light from the object 51. The light beam 49 from a light source 53 reflects from a beam splitter 55, through a lens system 62 reflects off the object 51 and passes through an objective lens 54 of conventional design and impinges onto a solid immersion lens (SIL) 56. The medium 5 resting on a stage 57 is placed within a critical distance f; images formed from such a system will have a high lateral spatial resolution in layer 16. The light beam 52 passes through an objective lens 54 of conventional design and impinges onto a solid immersion lens (SIL) 56. The SIL 56 is positioned within the near-field-coupling limit appropriate for the particular lens in use by the use of a positioning device 58. European Patent No. 1083553 provides an example of the means to position an SIL at the appropriate distance from the recording surface, which is incorporated by reference herein. Such a positioning device could be a flying head as is used in hard disk storage devices. Alternately there are many known in the art as nano or micro positioning technologies. The image 10 can be obtained from a variety of sources such as an illuminated object, a negative, print, and/or a softcopy display. The softcopy display can be a CRT, OLED or other similar type device. The image 10 can be monochrome or color.

Thus it can be seen that the present invention provides a image storage device and method wherein the storage device includes a photosensitive layer capable of retaining an optical image thereon and wherein the optical images may be written in a digital format that can also be read digitally.

The invention has been described in detail with particular reference to certain preferred embodiments thereof, but it will be understood that variations and modifications can be effected within the spirit and scope of the invention.

PARTS LIST 5 medium
10 image(s)
12 support structure
14 digital recording layer
16 imaging layer
17 top surface
19 data bits
20 digital data stream
33 protective layer
34 bottom surface
36 imaging layer
37 protective layer
49 light beam
50 apparatus
51 object
52 light beam
53 light source
54 objective lens
55 beam splitter
56 solid immersion lens (SIL)
57 stage
58 positioning device
62 lens system
80 imaging device
82 light beam
84 light source
86 beam splitter
88 objective lens
90 solid immersion lens (SIL)
91 laser
92 stage
93 photo detector
94 positioning device
95 logic, memory and control unit
96 sensor
97 light beam
98 lens system
99 light source
100 step
110 step
120 step
200 digital record
220 analog record
240 image
250 image
260 digital record
270 digital record
280 analog record
281 arrow
282 arrow
283 arrow
284 arrow
290 analog record

What is claimed is:

1. A photosensitive data storage product comprising a material having plurality of discrete microscopic optical analog images formed using near field optics in which each discrete microscopic optical analog image forms a digital bit thereon that can be read digitally, said plurality of discrete microscopic optical analog images forming a digital data stream representative of an image, at least one of said discrete microscopic optical analog images can be viewed optically using near field optics that is representative of said image.

2. The photosensitive data storage product according to claim 1 wherein the material further comprises a support structure having a photosensitive layer thereon.

3. The photosensitive data storage product according to claim 2 wherein said photosensitive layer includes photochromic molecules.

4. The photosensitive data storage product according to claim 2 wherein said photosensitive layer comprises a fluorescent material.

5. The photosensitive data storage product according to claim 2 wherein said photosensitive layer comprises a silver halide emulsion.

6. The photosensitive data storage product according to claim 2 wherein a protective layer is provided over said photosensitive layer.

7. The photosensitive data storage product according to claim 1 wherein the digital bit is no greater than 500 microns.

8. The photosensitive data storage product according to claim 1 wherein said material comprises a disc.

9. A method of producing a photosentive storage product having an image that can be read by both analog and digital optical methods, comprising:

forming a digital comprising a plurality of analog images using near field optics, each of said plurality of analog images form a digital bit having a size no greater than 500 microns, said digital data stream being representative of an image that can be read digitally, and at least one of said discrete digital bits comprising an analog image of said image that can be viewed optically using near field optics.

* * * * *

UNITED STATES PATENT AND TRADEMARK OFFICE
CERTIFICATE OF CORRECTION

PATENT NO. : 7,294,446 B2 Page 1 of 1
APPLICATION NO. : 10/045805
DATED : November 13, 2007
INVENTOR(S) : John P. Spoonhower et al.

It is certified that error appears in the above-identified patent and that said Letters Patent is hereby corrected as shown below:

Column 10, line 10 of claim 9.  "photosentive" should be replaced with --photosensitive--.

Column 10, line 13 of claim 9.  after "digital" insert --data stream--.

Signed and Sealed this

Eighth Day of April, 2008

JON W. DUDAS
*Director of the United States Patent and Trademark Office*